G. C. C. SHEAN & L. SCHMELZ.
CANDY PULLING MACHINE.
APPLICATION FILED AUG. 13, 1913.
1,112,569.
Patented Oct. 6, 1914.
3 SHEETS—SHEET 1.
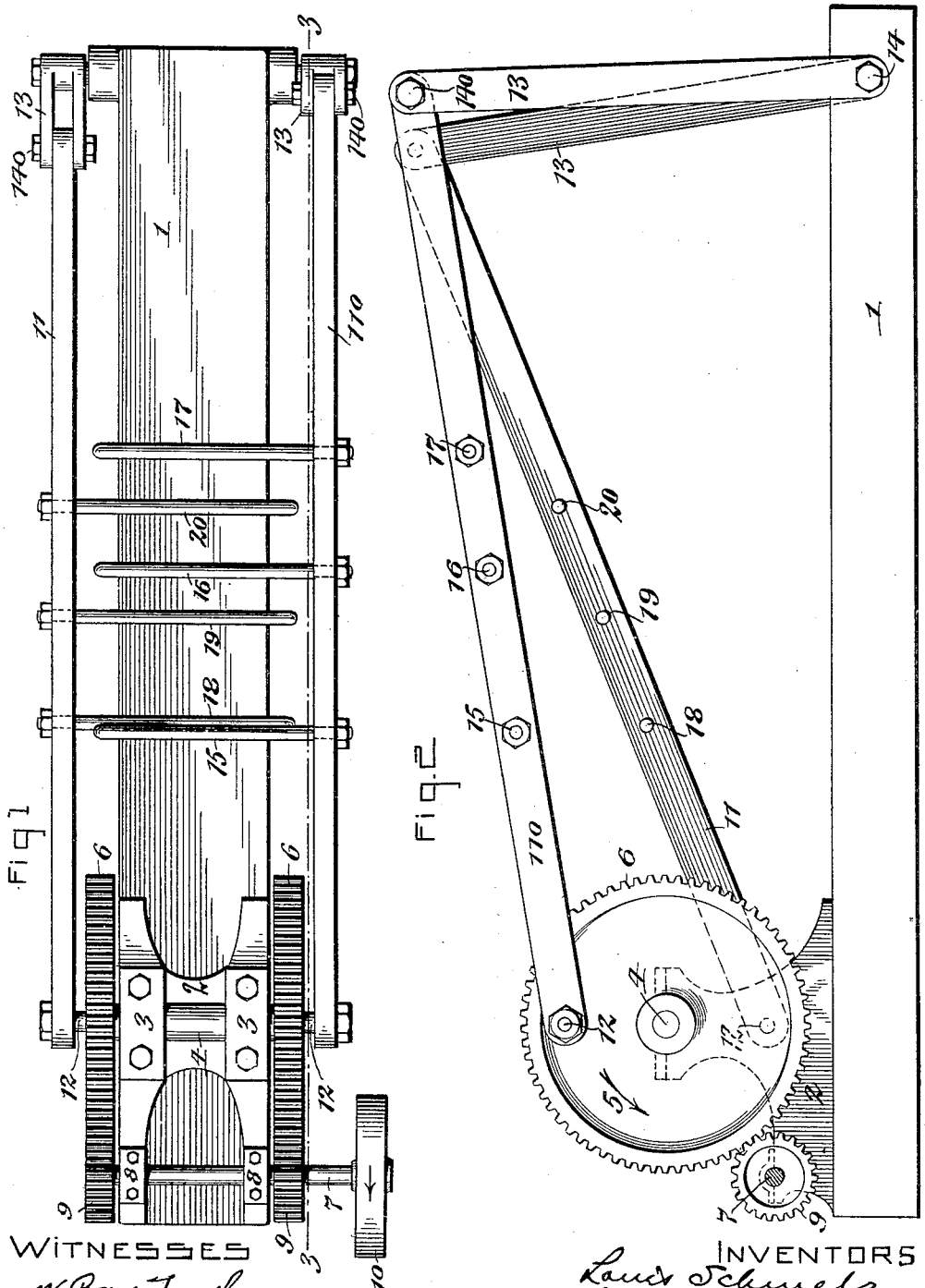

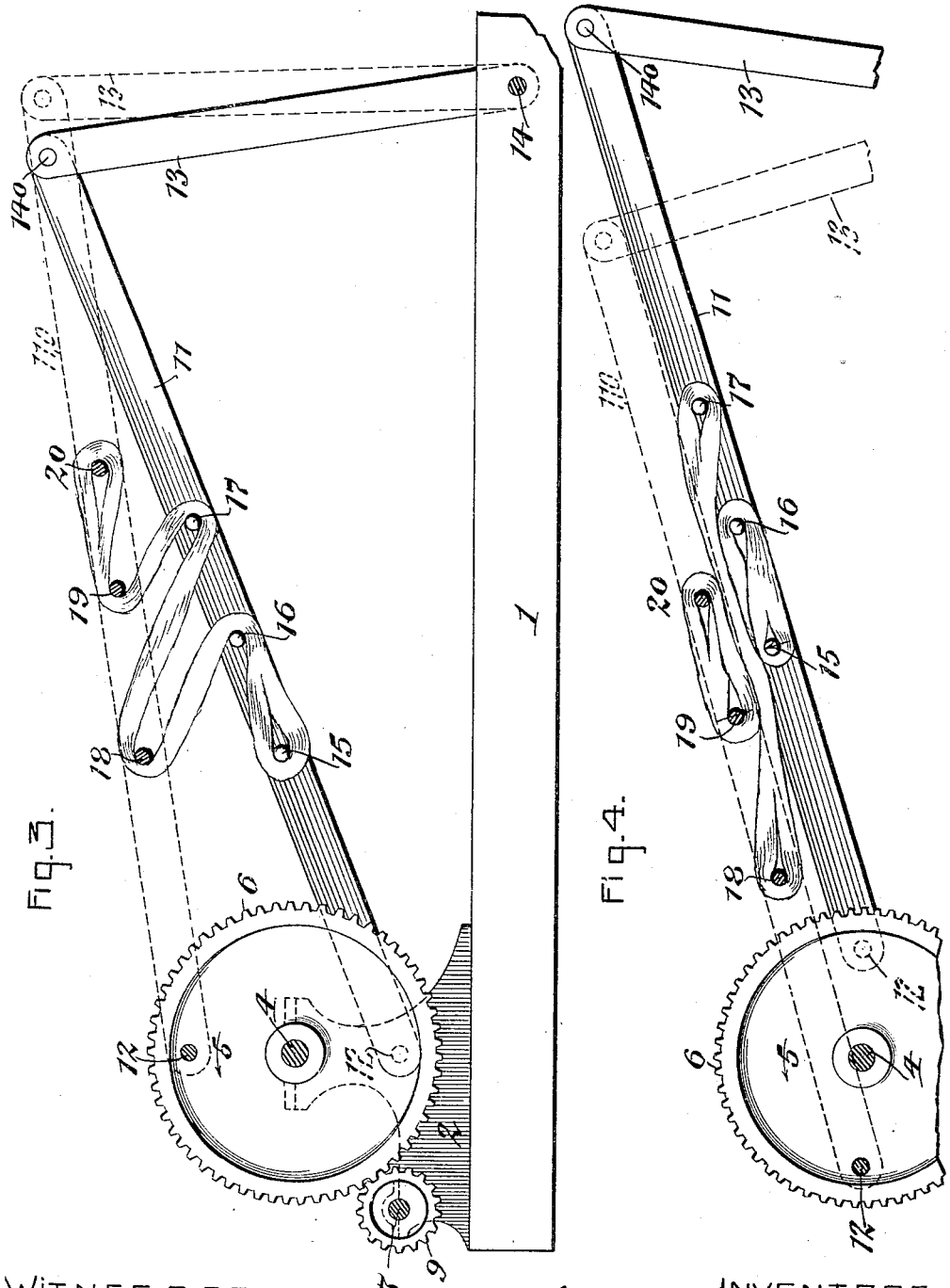

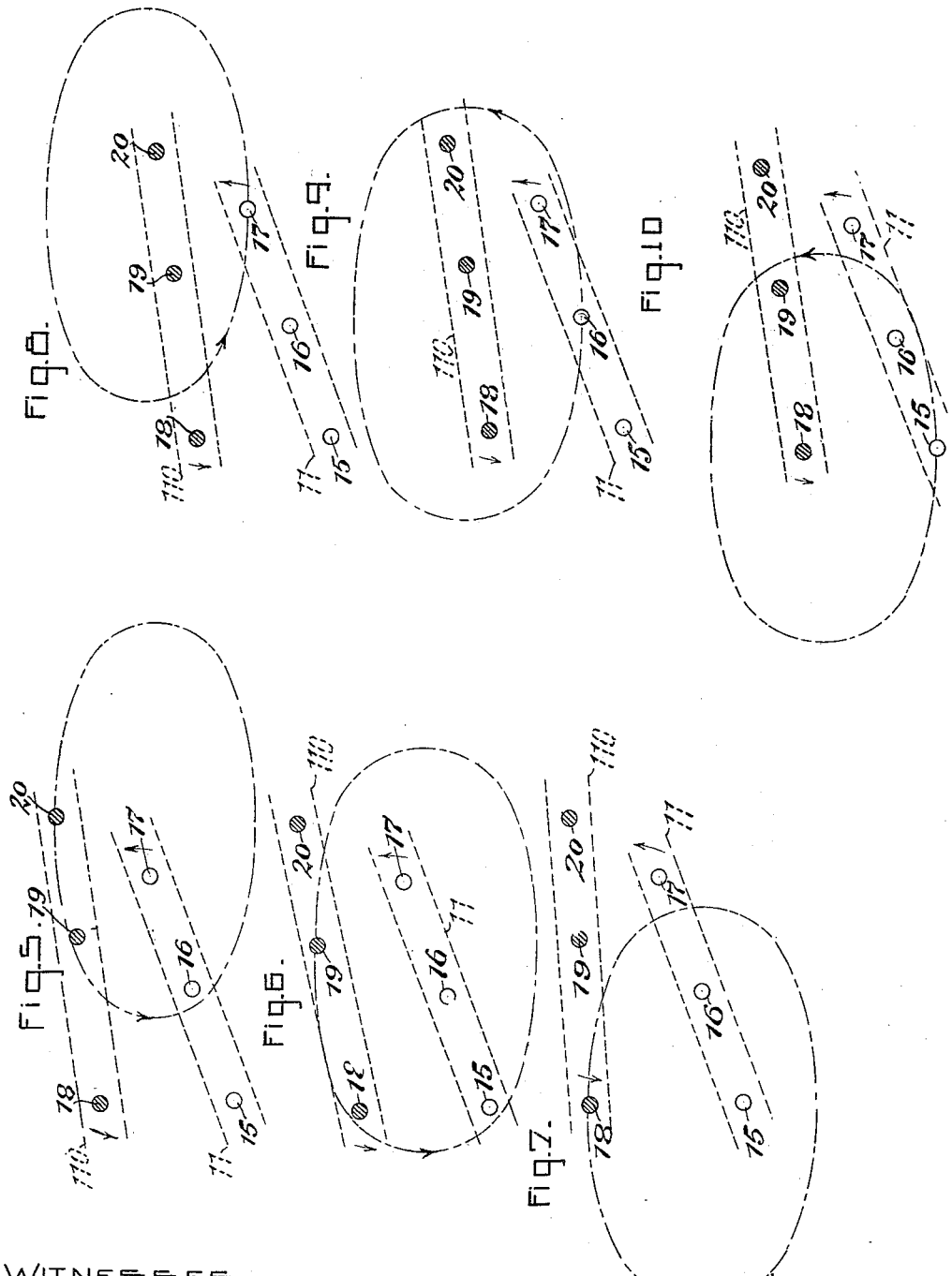

UNITED STATES PATENT OFFICE.

GEORGE C. C. SHEAN AND LOUIS SCHMELZ, OF BUFFALO, NEW YORK.

CANDY-PULLING MACHINE.

1,112,569.   Specification of Letters Patent.   Patented Oct. 6, 1914.

Application filed August 13, 1913. Serial No. 784,620.

*To all whom it may concern:*

Be it known that we, GEORGE C. C. SHEAN and LOUIS SCHMELZ, citizens of the United States, residing at Buffalo, in the county of Erie and State of New York, have invented new and useful Improvements in Candy-Pulling Machines, of which the following is a specification.

This invention relates to a candy pulling or working machine and has the object to produce a machine of comparatively simple and inexpensive construction which will thoroughly and effectively pull and mix candy with a minimum expenditure of power.

In the accompanying drawings: Figure 1 is a top plan view of our improved candy pulling machine. Fig. 2 is a side elevation thereof. Fig. 3 is a vertical longitudinal section taken in line 3—3, Fig. 2 showing the movable parts of the machine in one position. Fig. 4 is a similar view but showing the movable parts in another position. Figs. 5, 6, 7, 8, 9 and 10 are diagrammatic views illustrating the oval or elliptical path through which each of the candy pulling pins or grabs moves during each cycle of operations of the machine.

Similar characters of reference indicate corresponding parts throughout the several views.

1 represents the stationary base or frame of the machine which may be of any suitable construction. Upon the front end of this base is arranged a standard 2 which is provided in its upper part with two bearings 3 in which is journaled a transverse horizontal crank or operating shaft 4. A continuous rotary movement is imparted to this operating shaft, preferably in the anti-clockwise direction indicated by the arrow 5 in Fig. 2 by means which preferably comprise two gear wheels 6 fixedly mounted on opposite ends of the operating shaft, a transverse horizontal driving shaft 7 journaled in bearings 8 on the lower front part of the standard, and gear pinions 9 mounted on the driving shaft and meshing with the front parts of the gear wheels. Motion may be transmitted to the driving shaft from a prime mover by any suitable means, for instance, by a belt passing around a driving pulley 10 at one end of the driving shaft.

11, 11 represent two longitudinal and substantially horizontal operating or pulling bars arranged above the plane of the base and along the outer sides respectively of the gear wheels 6, 6. Each of these operating bars is operated with a crank motion at its front end from the operating shaft, this being preferably effected by means of crank pins or bolts 12 each of which pivotally connects the front end of one operating bar with the outer side of one of the gear wheels on one side of the center of the latter. The crank pins turn together but are arranged on their respective wheels so that they are always on diametrically opposite sides of the axis of the operating shaft and the gear wheels.

13, 13 represent two upright supporting rock arms which are pivoted by means of a horizontal transverse pin, bolt or rod 14 to the rear part of the base so that they swing in a vertical plane while their upper ends are pivotally connected by means of pivot bolts 140 with the rear ends of the operating bars, respectively.

On the opposing intermediate parts of the operating bars the same are provided respectively with a plurality of pulling pins or grabs which are adapted to receive the candy and to move past each other in such manner that some pins of one bar pass through the spaces between the pins of the other bar and thereby cause the candy upon the pins to be drawn or pulled out and mixed or worked in a manner resembling that in which this has been done heretofore by hand.

The number of pins which are employed on the two operating bars may be varied but the best results have been obtained by providing each bar with a set of pulling pins which is made up in multiples of three. In the preferred form which is shown in the drawings and which has been found satisfactory in practice, each of the operating bars is provided with a set of three pulling pins which are arranged in a longitudinal row relatively thereto and project transversely from the inner side of the respective bar. The spacing of these pins is determined according to the throw of the crank pins 12 of the distance of these pins from the center of the operating shaft, the length of the operating bars and the length of the rock arms and the location of their lower pivots. As shown in the drawings, the pulling pins 15, 16, 17 of the left hand operating bar are spaced equidistant while the distance between the intermediate and rear pulling pins 19, 20 of the right hand bar is the same as that between the pins of the left hand bar and the distance between the intermediate and front pins 19, 18 of the right hand bar is somewhat greater than the distance between the remaining pins.

During the operation of the machine and while the operating shaft and crank gear wheels are turning anti-clockwise when viewed from the right hand side of the machine, as shown in Figs. 2–10, the rear pulling pin 20 of the right hand bar will describe an oval or elliptical path during each complete cycle of operations during which this pin moves forwardly over the rear and intermediate pins 16, 17 of the other set, thence downwardly through the space between the intermediate and front pins 15, 16 of the other set and thence rearwardly underneath the intermediate and rear pins 16, 17 of the other set, as represented by the diagram in Fig. 5. The intermediate pulling pin 19 of the right hand set during each cycle of operations moves through an elliptical path which extends entirely around the outer side of the pulling pins of the set on the left hand operating bar, as represented by the diagram in Fig. 6. As the front pulling pin 18 of the set on the right hand bar effects a complete cycle of its movement the same also describes an elliptical path during which it moves forwardly over the rear and front pins 15, 16 of the other set, thence downwardly and rearwardly underneath the front and intermediate pins 15, 16 of the other set, and thence upwardly between the intermediate and rear pins 16, 17 of said other set, as represented diagrammatically in Fig. 7. The rear pulling pin 17 of the left hand operating bar during each cycle of operations of the machine passes rearwardly underneath the intermediate and rear pins 19, 20 of the right hand bar, thence upwardly and forwardly over the intermediate and rear pins 19, 20 of the right hand bar and thence downwardly through the space between the intermediate and front pins 18, 19 of the right hand bar, so as to describe an orbit which is diagrammatically represented in Fig. 8. The intermediate pin 16 of the set arranged on the left hand operating bar passes through an elliptical path which completely circumscribes the set of pulling pins of the right hand operating bar, as represented in Fig. 9. The foremost or front pulling pin 15 of the left hand operating bar during each cycle of operations of the machine passes through an elliptical path during which it passes rearwardly underneath the front and intermediate pins 18, 19 of the other set, thence upwardly between the intermediate and rear pins 19, 20 of the other set and thence forwardly over the intermediate and front pins 18, 19 of the other set to the place of beginning, as indicated diagrammatically in Fig. 10. It will thus be noted that the intermediate pulling pin of each set of one bar passes completely around the set of pulling pins of the other bar and that each pin at one end of one set passes through the space or gap between the end pin at the diagonally opposite extremity of the other set and its companion intermediate pin. By this means a constant changing about and mixing up of the candy is effected and the candy is not only pulled out or stretched but caused to continuously advance by gradual stages one part upon another lengthwise of the batch so that all parts of the candy are operated upon uniformly and results in a product which is of exactly the same consistency and quality throughout the entire batch. This is due to the fact that one of the pulling pins of each set passes downwardly through the space between two pins of the other set, another pin of the first mentioned set passes upwardly through a space between two pins of the other set and one of the pins of the first mentioned set passes completely around the pins of the other set, so that the candy is prevented from becoming lodged upon any one pin which would be liable to occur by a continuous or regular movement of one pin around another in one and the same direction. But since the candy lodged upon one set of pins is pulled both upwardly and downwardly as well as completely around one set of pins by the pins of the other set the candy is subjected to a pulling action in a variety of directions so as to cause the several stretches thereof to become variously intertwined or assembled, thereby resulting in a most perfect pulling out of all parts of the batch of candy and a uniform distribution and commingling of the ingredients thereof. This has been practically demonstrated by placing a small batch or quantity of candy of one color in a large mass of candy of another color and then proceeding with the pulling operation until the entire batch was completed when it was found that the coloring matter of the smaller batch was completely distributed throughout the larger batch so that the entire mass was of one shade throughout.

Aside from effectually and thoroughly pulling the candy, this machine, owing to the simplicity of its construction, can be produced at comparatively low cost, the same is very compact and requires but a small amount of floor space, and the same can also be operated with a minimum expenditure of power.

We claim as our invention:

1. A candy pulling machine comprising two movable supports, a set of pulling pins arranged on each of said supports, and means for operating said supports so that the pins of one support pass through the spaces between the pins on the other support and a pin of one support passes around all the pins of the other support.

2. A candy pulling machine comprising two movable supports, a set of pulling pins arranged on each of said supports, and means for operating said supports, so that a pin of each support passes downwardly through the space between two pins of the other support, and another pin of each support passes upwardly through the space between two pins of the other support, and a pin of each support passes around all the pins of the other support.

3. A candy pulling machine comprising two movable supports arranged adjacent to each other, a set of pulling pins arranged in a row on each support and projecting toward the other support, each of said sets comprising three pins, and means for moving said supports relatively to each other so that each pin at the extremity of the set on one support passes through the space between the two pins adjacent to the diagonally opposite extremity of the set of pins on the other support.

4. A candy pulling machine comprising two movable supports arranged adjacent to each other, a set of pulling pins arranged in a row on each support and projecting toward the other support, each of said sets comprising three pins, and means for moving said supports relatively to each other so that the pin at one extremity of each set passes in one direction through the space between two pins adjacent to the diagonally opposite extremity of the other set and the pin at the opposite extremity of each set passes in another direction through the space between two pins adjacent to the diagonally opposite extremity of the other set.

5. A candy pulling machine comprising two movable supports arranged adjacent to each other, a set of pulling pins arranged in a row on each support and projecting toward the other support, each of said sets comprising three pins, and means for moving said supports relatively to each other so that the pin at one extremity of each set passes in one direction through the space between two pins adjacent to the diagonally opposite extremity of the other set, the pin at the opposite extremity of each set passes in another direction through the space between two pins adjacent to the diagonally opposite extremity of the other set and an intermediate pin of each set passes completely around the other set of pins.

Witness my hand this 20th day of February, 1913.

GEORGE C. C. SHEAN.

Witnesses:
HARRY J. LEONARD,
BLANCHE SHEAN.

Witness my hand this 26th day of February, 1913.

LOUIS SCHMELZ.

Witnesses:
THEO L. POPP,
ANNA HEIGIS.

Copies of this patent may be obtained for five cents each, by addressing the "Commissioner of Patents, Washington, D. C."